United States Patent [19]

Malcok

[11] Patent Number: 5,235,960
[45] Date of Patent: Aug. 17, 1993

[54] CLAMPING SYSTEM FOR AN ANNULAR-SAW BLADE AND ITS USE IN THE SAWING OF BARS, IN PARTICULAR OF SEMICONDUCTOR MATERIAL, INTO WAFERS

[75] Inventor: Hanifi Malcok, Burghausen, Fed. Rep. of Germany

[73] Assignee: Wacker-Chemitronic Gesellschaft fur Elektronik-Grundstoffe mbH, Burghausen, Fed. Rep. of Germany

[21] Appl. No.: 973,554

[22] Filed: Nov. 9, 1992

Related U.S. Application Data

[63] Continuation of Ser. No. 719,332, Jun. 21, 1991, abandoned.

[30] Foreign Application Priority Data

Jun. 26, 1990 [DE] Fed. Rep. of Germany ....... 4020827

[51] Int. Cl.[5] .............................................. B28D 1/04
[52] U.S. Cl. .................................... 125/13.02; 125/15
[58] Field of Search ............. 125/15, 13.02; 51/73 R, 51/168; 83/698

[56] References Cited

U.S. PATENT DOCUMENTS

| 3,329,138 | 7/1967 | Lupardo | 125/15 |
| 4,498,449 | 2/1985 | Kachajian et al. | 125/15 |
| 4,716,881 | 1/1988 | Steere | 125/15 |

*Primary Examiner*—Eugenia Jones
*Attorney, Agent, or Firm*—Burgess, Ryan & Wayne

[57] ABSTRACT

In the annular sawing of bars, in particular of semiconductor material, the accurate fitting of the saw blade is of great importance. In the case of the conventional clamping systems, in which the saw blade is held on the machine rotary part by clamping forces exerted by means of a holding ring and is subjected to tension by means of an additional clamping ring, inadequate tensioning constancy is usually caused by the tensioning forces acting against the clamping forces. A tensioning behavior which is better in comparison can be achieved according to the invention by the tensioning forces being applied to the clamping ring by clamping elements releasably connected to the machine rotary part and consequently clamping forces and tensioning forces no longer being directed against one another. By the use of such clamping systems, longer saw blade service lives and higher sawing outputs can be achieved.

12 Claims, 3 Drawing Sheets

CLAMPING SYSTEM FOR AN ANNULAR-SAW BLADE AND ITS USE IN THE SAWING OF BARS, IN PARTICULAR OF SEMICONDUCTOR MATERIAL, INTO WAFERS

This application is a continuation of application Ser. No. 719,332, filed Jun. 21, 1991, now abandoned.

FIELD OF THE INVENTION

Background of the Invention

The invention relates to a clamping system for an annular-saw blade, in which the saw blade is held at its outer margin by means of a holding ring, connected via holding elements to a machine rotary part, and is tensioned by a clamping ring, which is integrated into the holding ring and can be pressed into a recess in the machine rotary part by means of clamping elements distributed over the periphery of the holding ring. It relates, furthermore, to the use of the clamping system in the sawing of bars, in particular of semiconductor material, into wafers.

Annular saws are used primarily in cases for cutting wafers off workpieces in bar form in which extreme accuracy is required in the cutting operation. The main area of application is therefore semiconductor technology, in which the wafers, thin slices of typically 0.1 to 1 mm thickness, are cut off usually monocrystalline bars of the semiconductor material, generally elemental semiconductors such as silicon or germanium, or compound semiconductors such as gallium arsenide or indium phosphide. In addition, annular saws are also used, for example, in the sawing of oxidic materials, such as gallium-gadolinium garnet or quartz or quartz glass, into wafers, allowing minimal tolerances.

In particular for the reason of high accuracy, it must be accomplished with such annular saws that the saw blade is held at its outer margin and is tensioned tightly in the manner of the skin of a drum, as a result of which the cutting edge of the saw blade, which is set with cutting grain and surrounds the centerhole, is guided during the cutting operation more stably with respect to deflections in comparison with externally cutting saws. However, it is accordingly important that the saw blade, as a rule made from rolled steel, is fitted accurately. Compensations have to be made in this operation for variations in the material characteristics, e.g. the deformability, caused for example by the rolling operation, and a central running of the saw blade, and in particular of the cutting edge, free from radial and axial unbalances, must be set, in order finally to be able to achieve good sawing results. It is also important here that, as far as possible, this setting does not change during the sawing operation under the influence of the forces acting on the saw blade.

With clamping systems of the type mentioned at the beginning, such as are known for instance from German Patent Specification 2,841,653 or U.S. Pat. Specification 4,498,449, annular-saw blades can be fitted with an accuracy which, when sawing semiconductor bars, in particular silicon bars of up to about 10 cm diameter, permits satisfactory yields of wafers within the usual tolerances with respect to the geometrical parameters specified by the component manufacturers. However, in cases of greater bar diameters, as in cases of more stringent specifications with respect to the wafer geometry, the proportion of the sawed wafers which no longer meet the requirements for geometrical precision, and therefore have to be discarded, increases.

SUMMARY OF THE INVENTION

The object of the invention was therefore to provide a clamping system which permits annular-saw blades to be fitted more reliably in comparison and with which even stringent geometrical requirements can be met with good yields when cutting semiconductor bars up into wafers.

The object is achieved by a clamping system of the type mentioned at the beginning wherein the axially adjustable clamping elements are releasably connected to the machine rotary part.

BRIEF DESCRIPTION OF THE DRAWING

The invention is explained in greater detail below with reference to FIGS. 1 to 3. In these figures, analogous components are provided with the same reference numerals.

DETAILED DESCRIPTION OF THE INVENTION

Figure 1:
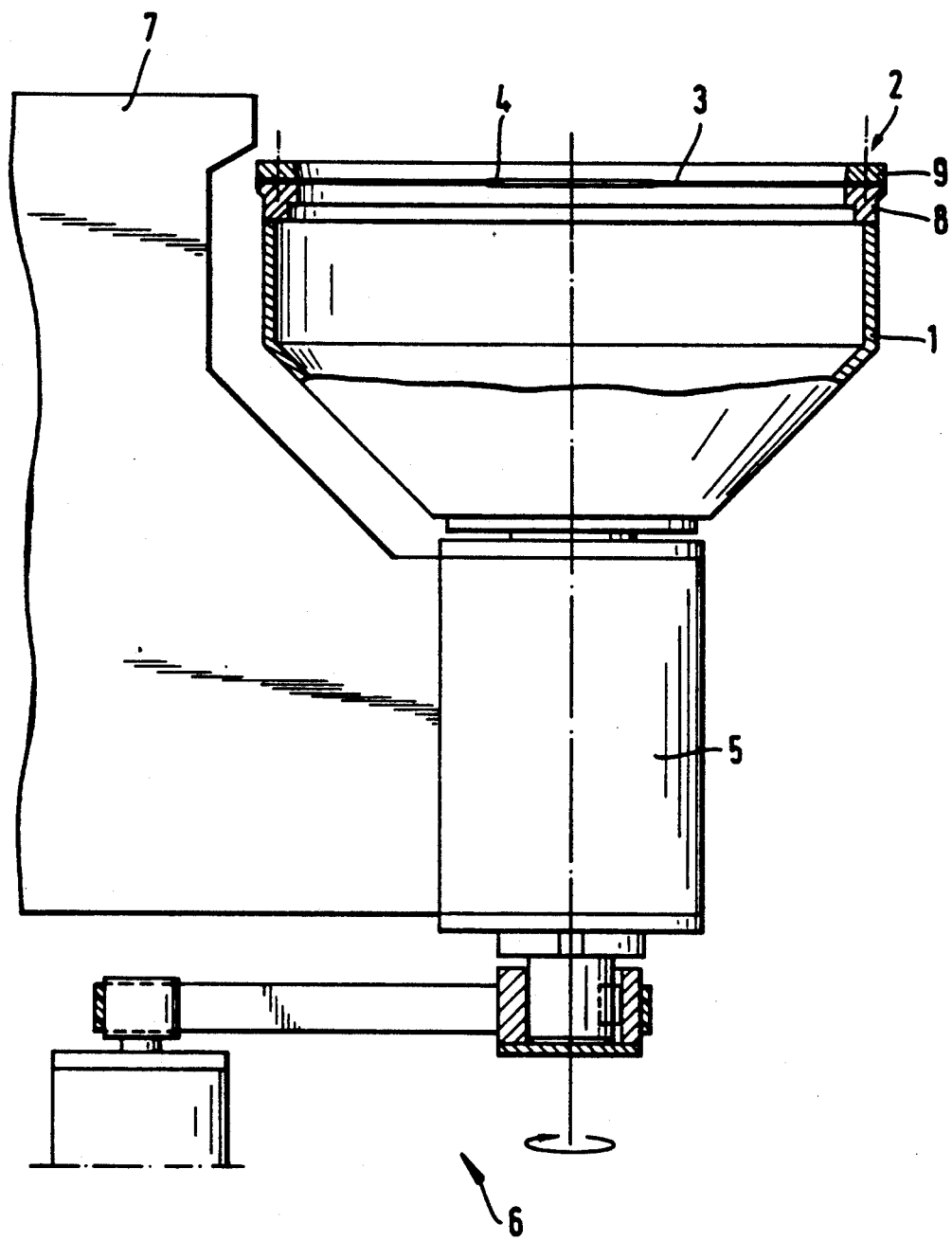
FIG. 1 is an elevational view in partial section showing machine rotary part usual in the case of annular saws, with annular-saw blade fitted by means of a known clamping system.

FIG. 1 shows the machine rotary part 1, which widens in a cup-like manner and to the end face of which the clamping system 2 is fastened, as a rule by screwing. With the aid of the clamping system 2, the annular-saw blade 3 is tensioned tightly from its outer margin, so that the cutting edge 4, usually exhibiting a drop-shaped cross-section, provided with diamond cutting grains embedded in a nickel coating and surrounding the central bore of the saw blade displays a concentricity free as far as possible from radial and axial disparities. The rotary part runs in a bearing 5 and is brought to the desired rotational speed by a drive 6, as a rule an electric motor. The frame 7 holding the arrangement is shown only diagrammatically here; in principle, with the various known types of device either a vertical position or a horizontal position of the axis of rotation is maintained.

In the sawing operation, the workpiece to be sawed, for example a semiconductor bar, is introduced by the intended amount into the centerhole with the aid of the workpiece infeed, not shown here for reasons of clarity. By means of an advancing device, a relative movement between workpiece and saw blade is then executed, during the course of which the cutting edge works through the workpiece and finally cuts off the desired wafer. After its removal, the workpiece and saw blade are once again brought back into cutting position, and the next wafer can be cut off.

Figure 2A:
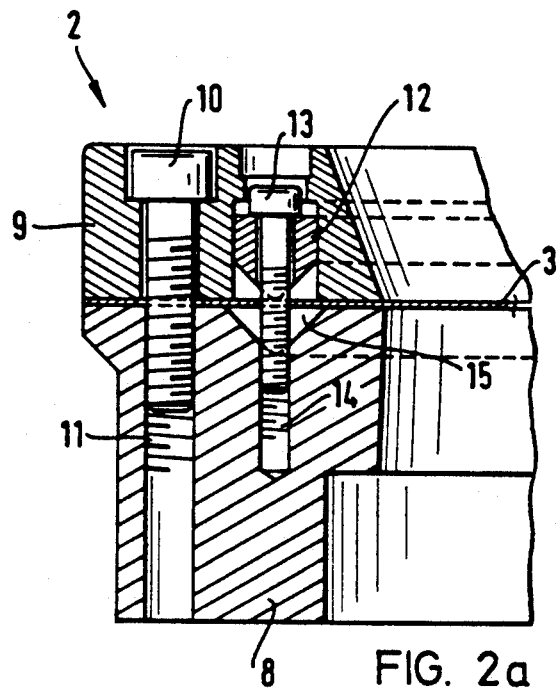
FIG. 2a is a sectional view of an embodiment of the clamping system according to the invention in an untensioned state.
Figure 2B:
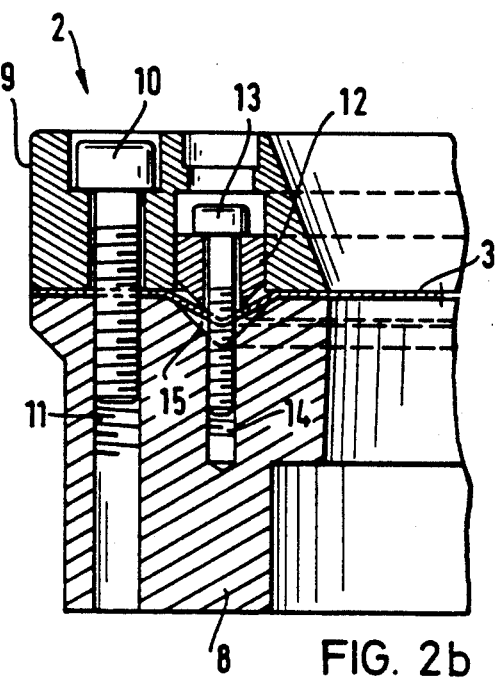
FIG. 2b is a sectional view of the embodiment shown in FIG. 2a in a tension state.
Figure 4:
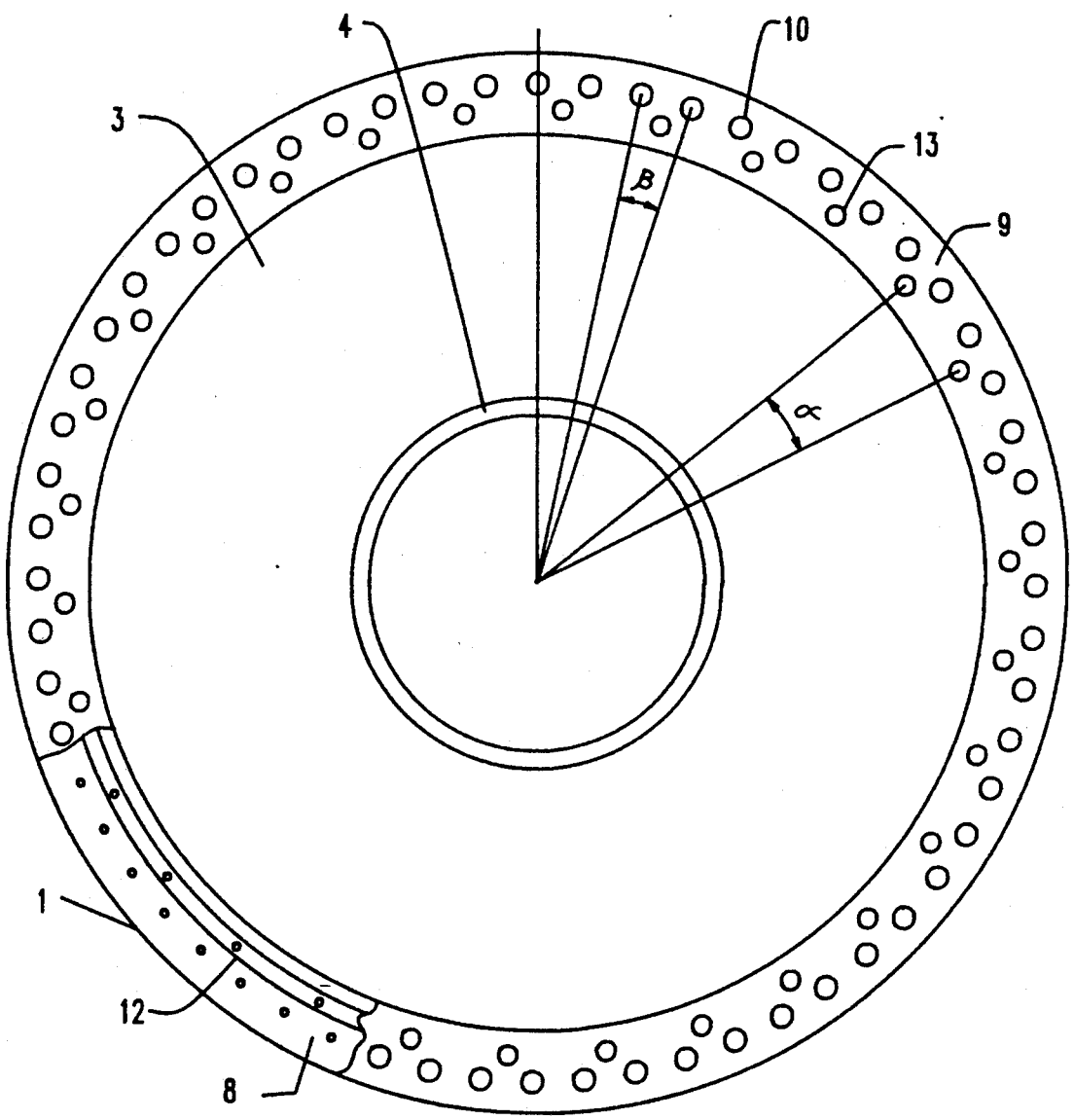
FIG. 4 is an elevational view in partial section showing a saw with a saw blade mounted according to FIG. 2(a) and 2b).

FIGS. 2a and 2b and FIG. 4 show an embodiment of the clamping system according to the invention, in the untensioned state and, in the tensioned state respectively. In the right-hand representation. In this arrangement, the saw blade 3 rests with its outer margin on the end part 8 of the machine rotary part 1. The saw blade is clamped in place with the aid of a holding ring 9, which is laid on the saw blade and connected, preferably screwed, to the end part initially with the aid of suitable holding elements, preferably holding screws 10, distributed over its entire periphery, by means of dimensionally appropriately predetermined fixtures, preferably threaded bores 11. As a result, the saw blade is initially fixed between the end part and holding ring at its outer margin, but is still in the untensioned state.

In this state, the clamping ring 12, integrated into the holding ring and displaceable in the axial direction, is not pressed by means of the clamping elements provided, in particular clamping screws 13, against the saw blade; said clamping elements engage only loosely in the receptacles predetermined dimensionally appropriately in the end part, which are configured in particular as threaded bores 14. Consequently, the saw blade also does not as yet experience any deforming force which deflects it out of the untensioned starting position in the direction of the clearance provided in the end part for its reception, advantageously an annular groove 15, which is expediently shaped dimensionally appropriately with respect to the surface of the clamping ring acting on the saw blade.

In the clamping operation, the clamping elements, in particular clamping screws 13, distributed over the periphery of the clamping ring, are progressively tightened. As a result, the clamping ring 12 is drawn increasingly against the saw blade 3 and presses the latter into the annular groove 15. Depending on the intensity of this deformation, i.e. with the clamping screws being screwed in further or less far, a more or less strong tensile stress can be applied to the saw blade, distributed around the periphery, so that it is ultimately possible to give the saw blade the uniform and tight tensioning required for an accurate sawing operation. At the same time, the clamping operation allows compensation for radial irregularities in the running of the cutting edge, by the centerhole periphery being drawn outward to a greater or lesser extent by corresponding adaptation of the tensioning of the saw blade. In this case, an all the more finely graduated setting is possible the smaller the thread pitch, although the usual thread pitches of 0.5 to 1.5 mm as a rule permit an adequately accurate clamping operation.

As shown in FIG. 4, the clamping screws, the corresponding leadthrough openings for them in the clamping ring and the corresponding threaded bores in the annular groove are advantageously distributed uniformly over the periphery of the clamping ring and are preferably arranged at the same intervals from one another. In this way it is ensured that the tensioning forces acting on the saw blade are distributed uniformly over its periphery and unbalances in the machine rotary part/clamping system/saw blade system caused by uneven mass distribution are avoided during the rotation. At the same time, it is not compulsory for the number of clamping screws to be the same or half the number of holding screws, although such embodiments with the same or half the number have proved to be particularly successful, since they are the simplest way of ensuring a mass distribution which is as rotationally symmetrical as possible and consequently free from unbalances. In this preferred case, arrangements in which clamping and holding screws are in each case provided one after the other on a line pointing radially to the axis of rotation, or as shown in FIG. 4 in a position centrally offset in each case in comparison with the above, have proved successful. As shown in FIG. 4, the number of clamping screws distributed over the periphery of the clamping ring is expediently chosen such that the angles $\alpha$ between successive clamping screws, measured from the axis of rotation of the system, lie in the range from 5° to 30°, preferably 10° to 20°, these angles advantageously having the same value. Arrangements in which the distances of the clamping screws from one another, measured in each case from screw center to screw center and along the curved center line of the clamping ring, lie in the range from 50 to 100 mm and are preferably the same have proved to be particularly stable.

The advantage of the clamping system according to the invention is that the clamping forces holding the saw blade, exerted by the holding ring, and the tensioning forces act in the same sense and, as a result, both an improved clamping and a more reliable tensioning of the saw blade is achieved. Surprisingly, it was also found that the necessary additional bores in the saw blade do not have as a consequence any increased susceptibility to deformation or cracking or instabilities in the sawing operation. On the other hand, in the case of the known clamping systems, the tensioning forces exerted by the clamping screws act against the clamping forces and cause a deformation of the holding ring and, ultimately, a reduced retention of the saw blade, caused by the widening of the clamping surfaces. The effects in practice are poor concentricity and saw blades "drawn out of the ring", i.e. excessively deformed during tensioning and no longer seated satisfactorily in the holding ring.

Figure 3A:
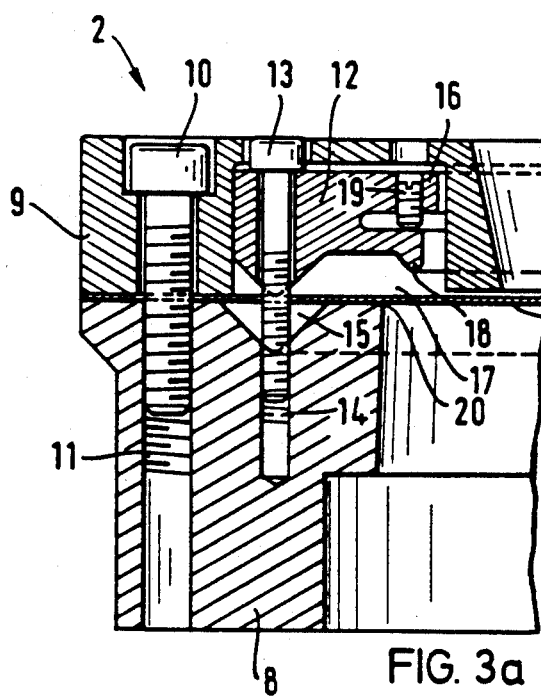
FIG. 3a is a sectional view of another embodiment of the clamping system according to the invention in an untensioned state which provides for the accurate fitting of the saw blade and a correction of running inaccuracies in the axial direction.
Figure 3B:
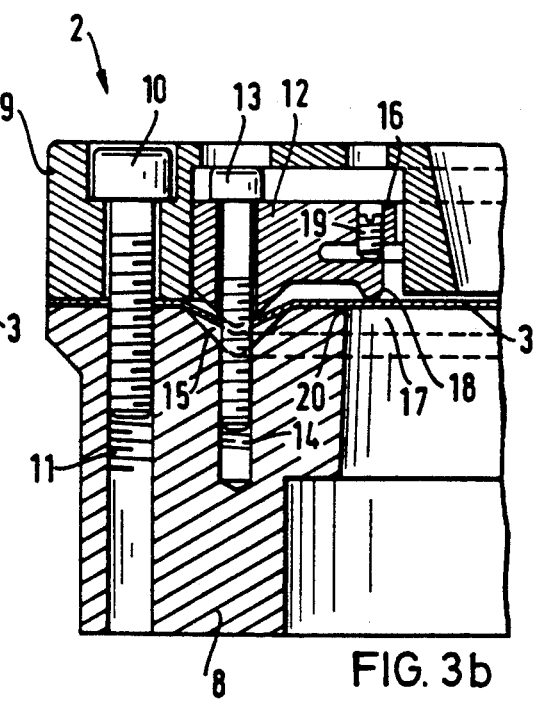
FIG. 3b is a sectional view of the embodiment shown in FIG. 3a in a tension state.

A further development of the invention, which permits not only the fitting of the saw blade and the correction of radial running irregularities but also a correction of axial running irregularities of the saw blade, is shown in FIGS. 3a and 3b clamping ring 12 in this case merges at its inner periphery into a bridge part 16, which juts out into the free region 17 of the saw blade and has a preferably bead-like projection 18, and to which a deflection in the axial direction can be imparted with the aid of adjusting devices, preferably setscrews 19.

When tensioning the saw blade, in analogy with the method described in conjunction with FIGS. 2a and 2b, the saw blade is pressed into the annular groove 15 by the clamping ring. In addition, by tightening the setscrews 19 to a greater or lesser extent, the saw blade can then be deflected in the axial direction out of the standard position predetermined by the inner edge 20 of the end part. Consequently, it is possible to compensate the deviations of the saw blade in the axial direction from its ideal, undisturbed running, the so-called "axial runout", which as a rule can reach values of up to about 100 $\mu$m.

As a rule, the setscrews are provided in the same number and in an analogous arrangement as the clamping screws. Just as important is a rotationally symmetrical, uniform distribution over the periphery of the bridge part, in order to avoid mass-related unbalances. Sometimes, however, an increased number may be necessary in order to be able to set the deflection of the projection 18 with sufficient accuracy, which may be the case for example with large clamping ring diameters. However, experience shows that even such arrangements run most steadily when they are rotationally symmetrical with respect to the holding screws, clamping screws and setscrews.

In the clamping operation, axial and radial runout of the saw blade can be determined in each case location-dependently in trial rotations of the saw blade with the aid of suitable measuring instruments and sensors, for example commercially available optical concentricity measuring devices or mechanical feelers. This then determines the position of the clamping screws and, in the case of the embodiment of the invention according to FIGS. 3a and 3b, also of the setscrews, which require a readjustment, and whether they have to be tightened to a greater or lesser extent in order to achieve an optimum adjustment of the saw blade. In most cases, after a few preliminary trials, it can even be concluded from the measured deviation how many turns of the clamping screws, and if appropriate setscrews, in the suitable position, are necessary for their correction.

With the aid of the clamping systems according to the invention, annular-saw blades can be fitted into the machine rotary parts provided for their reception with high precision remaining constant over long operating times of the saw blade and it also being possible to achieve higher saw blade tensionings. Accordingly, on the one hand the cutting precision in the actual sawing operation increases, on the other hand the service life of the saw blades also increases, which is reflected in turn in shorter setting-up times and higher sawing output. Therefore, the clamping system is used with particular advantage in the case of sawing operations in which extreme precision matters. Consequently, a preferred area of application is the annular sawing of crystal bars, in particular semiconductor bars, to be precise preferably bars of monocrystalline silicon.

The invention is explained in greater detail below with reference to an illustrative embodiment: Example:

In the case of a commercially available arrangement for the annular sawing of monocrystalline silicon bars, which was constructed analogously to the apparatus represented in FIG. 1, the machine rotary part (outside diameter about 690 mm) had been converted for use of the clamping system according to the invention. For this purpose, a total of 30 threaded bores (thread pitch 1 mm) had been additionally made at 12° intervals on its end face in the concentrically running annular groove, milled in concavely about 3.5 mm, in order to be able then to screw the clamping screws into the machine rotary part during the actual clamping operation. The distance from screw to screw was consequently about 65.5 mm.

Correspondingly positioned and dimensioned bores had also been made in the circular clamping ring (diameter about 645 mm, cross-section as shown in FIGS. 2a and 2b) as well as in the circular saw blade provided for fitting (centerhole diameter about 235 mm, nickel-/diamond-set cutting edge) of rolled stainless steel (thickness about 0.15 mm).

Then, the saw blade was initially laid on the end part in the starting position, in the usual way with the aid of positioning pins provided on the machine rotary part, and the holding ring with the axially movable clamping ring integrated therein was laid on top. Thereafter, the 60 holding screws, distributed at 6° angular intervals over the holding ring, were screwed in and tightened, so that finally the saw blade was clamped in firmly at its outer margin between holding ring and machine rotary part, but was still not under tension.

Next, the 30 clamping screws were then introduced into the bores provided for their reception—these did not in each case lie in line with the holding screws but centrally offset, in relation to the axis of rotation of the system—and were tightened to such an extent that the clamping ring was in contact with the saw blade around its entire periphery. Thereafter, a basic tension was applied to the saw blade by each screw being tightened one full turn. Subsequently, a revolution of the machine rotary part was performed and, during this revolution, the radial deviation of the cutting edge of the saw blade from ideally circular running was determined location-dependently with the aid of commercially available measuring optics. Depending on the extent of the deviation, the clamping screws in the respective regions were then further tightened to a greater or lesser extent and, as a result, the centerhole of the saw blade was stretched outward with changing intensity, in order to compensate for its "radial run-out". The tensioning step was followed by a further saw blade rotation and location-dependent measurement of the still remaining "radial run-out". According to the measured, already distinctly smaller deviations, the clamping screws were then tightened again in the regions stretched too little, the centerhole stretching resulting from a certain number of turns of the clamping screws being roughly known from preliminary trials and it thus being possible to estimate the required turning of the screws. In a final saw blade rotation, it was found that the "radial run-out" had been reduced to a deviation of less than 20 $\mu$m from the ideal circular path of the centerhole and consequently of the cutting edge.

The saw blade fitted in the clamping system in such a manner was then used to saw in the usual way monocrystalline silicon bars (bar diameter about 150 mm) into wafers of about 850 $\mu$m thickness.

In a control test, the saw blade in an annular saw of the same type was fitted in a conventional clamping system according to German Patent Specification 2,841,653, in which there was no screw connection of the clamping screws to the machine rotary part. Otherwise, the fitting was carried out by the method given above until the radial run-out had been suppressed to a value below 20 $\mu$m. With the saw blade fitted in such a manner, monocrystalline silicon bars (diameter about 150 mm) were likewise sawed into wafers of about 850 $\mu$m thickness at the same time under otherwise identical process conditions.

The evaluation of the two sawing operations revealed that, compared with the control test, it was possible in the case of the clamping system according to the invention to reduce distinctly the number of sharpening interventions necessary for resharpening the saw blade; it was about one third of the number of sharpening interventions necessary in the case of the conventional clamping system. The number of wafers sawed within an eight-hour shift in the case of the saw equipped with the clamping system according to the invention was about 18% above the saw with the conventionally fitted saw blade. Moreover, it was possible to achieve a 70% longer saw blade service life.

I claim:

1. A clamping system for clamping an annular saw blade to a machine rotary part having a recess, comprising:
    a holding ring;

a plurality of holding element means for connecting said holding ring to said machine rotary part so that said holding ring holds an outer margin of the saw blade between said machine rotary part and said holding ring;

clamping ring means for applying tension to the saw blade at a location which is radially interior of said outer margin, said clamping ring means being integrated into the holding ring; and a plurality of axially adjustable clamping element means for causing the clamping ring to press a portion of the saw blade into the recess of the machine rotary part so as to tension said saw blade, said axially adjustable clamping element means extending into direct and releasable connection with the machine rotary part sand said plurality of axially adjustable clamping element means being distributed over the periphery of the holding ring.

2. The clamping system of claim 1, wherein the clamping element means include clamping screws.

3. The clamping system of claim 1, wherein the clamping ring means includes bridge part means for axially deflecting the saw-blade, said bridge part means extending into a free region of the saw blade.

4. The clamping system of claim 3, wherein the bridge part means is in the form of a bead-like projection.

5. The clamping system of claim 3, wherein the clamping ring means further includes adjustment means for axially adjusting said bridge part means to axially deflect the saw blade.

6. The clamping system of claim 5, wherein the adjustment means is a set screw.

7. The clamping system of claim 1, wherein successive clamping element means are set at an angle from each other of from 5° to 30° from the axis of rotation of the clamping system.

8. The clamping system of claim 7, wherein the angles are the same.

9. The clamping system of claim 1, wherein the clamping element means are arranged centrally offset from the axis of rotation of the clamping system in relation to the holding element means.

10. The clamping system for clamping an annular saw blade to a machine rotary part having a recess, comprising:

a holding ring positioned on an opposite side of said saw blade from said machine rotary part;

a plurality of holding element means for connecting said holding ring to said machine rotary part so that said holding ring holds an outer margin of the saw blade between said machine rotary part and said holding ring;

clamping ring means for applying tension to the saw blade at a location which is radially interior of said outer margin, said clamping ring means being integrated into the holding ring; and a plurality of axially adjustable clamping element means for causing the clamping ring means to press a portion of the saw blade into the recess of the machine rotary part so as to tension said saw blade, said axially adjustable clamping element means extending through said clamping ring means into direct and releasable connection with the machine rotary part and said plurality of axially adjustable clamping element means being distributed over the periphery of the holding ring.

11. A method of sawing a bar into wafers, comprising the steps of:

clamping an annular saw blade to a rotary machine with a clamping system comprising:

a holding ring;

a plurality of holding element means for connecting said holding ring to said machine rotary part so that said holding ring holds an outer margin of the saw blade between said machine rotary part and said holding ring;

clamping ring means for applying tension to the saw blade at a location which is radially interior of said outer margin, said clamping ring means being integrated into the holding ring; and a plurality of axially adjustable clamping element means for causing the clamping ring means to press a portion of the saw blade into the recess of the machine rotary part so as to tension said saw blade, said axially adjustable clamping element means extending into direct and releasable connection with the machine rotary part and said plurality of axially adjustable clamping element means being distributed over the periphery of the holding ring; and cutting the bar into wafers with said annular saw blade.

12. The method of claim 11, wherein the wafers have a thickness of from 0.1 to 1mm.

* * * * *